No. 851,964. PATENTED APR. 30, 1907.
M. ROSENKRANZ.
NUT LOCK.
APPLICATION FILED JAN. 30, 1907.
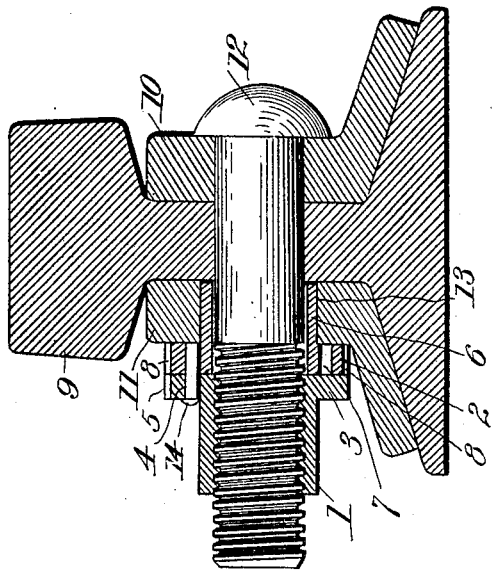
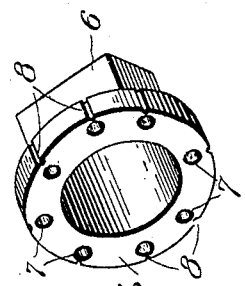
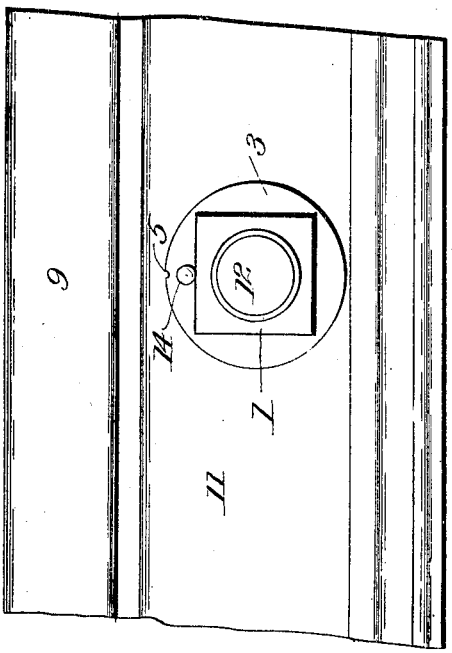
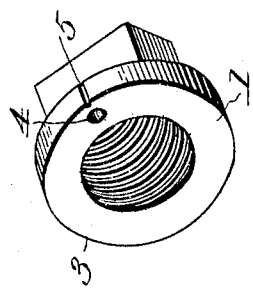
Inventor,
Mathias Rosenkranz.
Witnesses
C. H. Walker,
H. L. Kelly.
By R. A. Shepard & Co.
Attorneys.

UNITED STATES PATENT OFFICE.

MATHIAS ROSENKRANZ, OF PUEBLO, COLORADO.

NUT-LOCK.

No. 851,964.  Specification of Letters Patent.  Patented April 30, 1907.

Application filed January 30, 1907. Serial No. 354,922.

*To all whom it may concern:*

Be it known that I, MATHIAS ROSENKRANZ, a citizen of the United States, residing at Pueblo, in the county of Pueblo and State of Colorado, have invented certain new and useful Improvements in Nut-Locks, of which the following is a specification.

This invention relates to nut locks, and while capable of general application is particularly designed for railway work, engines and machinery.

It is an important object of the invention to enable the repeated use of the device without damage to the bolt, the nut, or any portion of the lock.

A further object of the invention is to embody the same as a complete device which is independent of the bolt and therefore applicable to any ordinary bolt.

With these and other objects in view, the present invention consists in the combination and arrangement of parts as will be hereinafter described, shown in the accompanying drawings and particularly pointed out in the appended claims, it being understood that changes in the form, proportion, size and minor details may be made, within the scope of the claims, without departing from the spirit or sacrificing any of the advantages of the invention.

In the drawing,—Figure 1 is an elevation of a portion of a railway track having the nut lock of the present invention applied thereto. Fig. 2 is a sectional view taken transversely through Fig. 1. Fig. 3 is a detail perspective view of the nut of the present invention. Fig. 4 is a detail perspective view of the locking washer.

Like characters of reference designate corresponding parts in each of the figures of the drawing.

The device of the present invention includes a nut 1 and a locking washer 2. The nut has a threaded bore, as usual, and in addition is provided at its inner end with a circular head or flange 3 pierced by a perforation 4, and having an edge notch 5 in a line with the opening and constituting a pointer or index to indicate the position of the opening. If desired, more than one opening may be provided, for instance, one for each face of the nut.

The locking washer 2 is preferably circular or of disk form having substantially the same diameter as that of the head or flange of the nut. The bore of the washer is smooth and slightly greater in diameter than that of the nut. From the back of the washer there projects a boss 6 which is non-circular on its exterior, preferably rectangular in cross section, and concentric with respect to the bore of the washer. That portion of the washer which projects beyond the boss constitutes an annular flange which is pierced by an annular series of perforations 7, with which the perforation 4 of the nut is designed to successively register. The peripheral edge of the washer is provided with a series of notches 8, one for each perforation 7 so as to indicate the position thereof.

One application of the present invention has been shown in Figs. 1 and 2, wherein 9 indicates an ordinary track rail, 10 and 11 the usual fish plates, and 12 a bolt piercing the web of the rail and the fish plates. These parts are of the common or ordinary form, except that the fish plate 11, which is remote from the head of the bolt, is provided with a non-circular opening 13 larger than the diameter of the bolt and of a size and shape to receive the boss 6 of the locking washer, thereby to prevent rotation of the washer. The nut is screwed upon the bolt until it is tight against the washer with the notch or index 5 registering with one of the notches or indexes 8 of the washer, in which position the perforation 4 of the nut is alined with one of the perforations of the washer. A locking pin or key 14 is then driven through the alined openings, whereby the nut and washer are interlocked against independent rotation and, as the locking washer is held against rotation by reason of its non-circular boss fitting in the non-circular opening in the adjacent fish plate, the nut is effectually locked in a very simple and convenient manner. The importance of the edge notches or indexes on the peripheries of the nut and the washer will now be apparent, for the reason that the perforations of the washer are covered and concealed by the nut, and therefore it would be practically impossible to determine when the perforation of the nut is in alinement with a perforation of the washer. Whenever it is desired to remove the nut, the locking pin is withdrawn, whereupon the nut can be unscrewed and the washer removed if desired. It will now be understood that neither the bolt, the nut nor the washer is in any wise damaged by the removal of the nut, and, therefore, the device may be repeatedly used.

A very important feature of the invention is that the device is complete in itself and may be put upon the market in standard sizes independent of the bolts, whereby the device is applicable to bolts now in use and does not require any specially prepared bolts nor any change or addition to bolts now in use.

What is claimed is:—

1. A nut lock comprising a washer having a smooth bore and provided with a reduced boss which is non-circular on its exterior and concentric with the bore, the washer being substantially circular in shape and provided with an annular series of perforations, there being edge notches in the periphery of the washer in alinement with the respective perforations, and a nut provided at one end with a substantially circular flange pierced by a perforation adapted to successively register with the perforations of the washer and provided with an edge notch indicating the position of the perforations.

2. A nut lock comprising a washer having a smooth bore and a non-circular boss upon one side of the washer and an opening in the other side of the washer, and a nut provided with a perforation arranged to register with the opening of the washer, the peripheral edge of the washer having an index indicating the position of the opening, and the periphery of the nut having an index indicating the position of the opening in the nut and arranged for registration with the index of the washer.

3. The combination of a bolt and a member pierced thereby, said member having a non-circular opening through which the bolt projects, a washer having a smooth bore and a non-circular boss upon its rear side fitting the non-circular opening and thereby held against rotation, a nut upon the bolt, the washer and nut having registered openings, and provided with notches in their peripheries indicating their respective openings, and a locking key fitting in the registered openings.

4. A nut lock comprising a substantially circular washer having a smooth bore and a non-circular boss upon one side thereof and concentric with the bore, the other side of the washer being provided with an annular series of openings, the periphery of the washer having an annular series of indexes indicating the positions of the respective openings, and a nut having a perforation for successive registration with the openings of the washer and also provided with an index indicating the position of the opening and arranged for successive registration with the indexes of the washer to indicate when the opening of the nut is alined with an opening of the washer.

In testimony whereof I affix my signature, in presence of two witnesses.

MATHIAS ROSENKRANZ.

Witnesses:
G. F. WAGNER,
NIKOLAUS GALLION.